Patented Dec. 23, 1947

2,433,297

UNITED STATES PATENT OFFICE 2,433,297

PROCESS FOR THE SEPARATION OF MAGNESIUM CARBONATE FROM CALCIUM CARBONATE

Robert A. Schoenlaub, Tiffin, Ohio, assignor to Basic Refractories, Inc., Cleveland, Ohio, a corporation of Ohio No Drawing. Application May 8, 1943,
Serial No. 486,215

9 Claims. (Cl. 23—67)

Efforts have been made from time to time to utilize magnesia from low grade mixed sources, and in general the separation of magnesia from native sources, such as carbonate rocks, has proceeded along chemical lines, and it has been necessary to work with dilute solutions and precipitate the magnesium content for instance in the form of hydroxide. These methods involve the pumping, settling, filtration and heating of such large quantities of dilute solutions and suspensions, as to render the magnesia products too expensive to successfully compete with products from high grade sources which have been available by importation when the international political and trade conditions are sufficiently tranquil, but which in time of war may be cut off. Domestic raw materials in which magnesia is but one of two or more constituents are sufficiently plentiful and uniform to be attractive generally if adequate low cost separation methods could be provided; and by the present invention it now becomes possible to separate such magnesia along primarily mechanical lines permitting mass production and involving relatively low costs as contrasted with the usual chemical methods.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Magnesia-providing material may, in accordance with the invention, be dolomite or other magnesia-providing carbonate or oxide or hydroxide rock, including relatively pure dolomite, impure and low grade dolomites, predazzite, pencatite, magnesite, etc. For conciseness, all of such are hereinafter referred to as "dolomite."

The invention comprises the essential steps of cancination of dolomite to a degree necessary to make the magnesia reactive, the growth in a water slurry of the calcined dolomite of hydrous magnesium carbonate which is discrete and mechanically separable from the residual calcium carbonate, and subsequent separation of the hydrous magnesium carbonate by froth flotation. The details of the process are described in the following paragraphs.

The raw material, preliminarily crushed if necessary, is calcined at a suitable temperature. This temperature must be above the dissociation temperature of magnesium carbonate and may be as high as desired within practical limits. The actual calcination temperature employed is variable according to the nature of the rock and is governed by economic and other considerations. A partial or differential calcination in which all of the magnesium and part of the calcium carbonate is decomposed to the oxide is, in particular, economically advantageous. For instance, a dolomite burned to an ignition loss of 10–15 per cent is satisfactory. Some dolomites when calcined to certain temperature ranges will, on slaking, disintegrate to grains which are almost colloidal in size. While some disintegration on slaking may be desirable, such extreme disintegration forms an excess of slimes and interferes with proper separation by froth flotation.

The suitably calcined dolomite is mixed with water to form a slurry. The size of the dolomite grains in such a slurry has an important bearing upon the operation of the process. In general, they should be fine enough to form a slurry which is easily maintained in a suspended state and fine enough that the magnesia may be easily removed from the grains. They should not be so fine that they are occluded in the magnesium carbonate, entrained during flotation, or interfere, by reason of their small size, with subsequent flotation or filtration. The grain size for any specific material is a matter of operational convenience and economics and can readily be determined by test. The proper size of grain may be obtained by any combination of grinding or classification, or by natural disintegration on slaking. I have found a dolomite calcined at about 2400° F. and dry-milled to about 90% —200 mesh to give good results.

The calcined dolomite in a suitable size is mixed with water to form a slurry. Desirable proportions are about 1 part of dolomite, calculated to the dead-burned basis, to about 12 parts of water. More concentrated slurries become thicker in the later part of the process than can be easily handled, the hydrous magnesium carbonate does not form so discretely, the temperature rise during the processing may be more than desired, and, finally, the susceptibility of the slurry to flotation drops sharply with the thicker slurries. The slurry may be more dilute than 1 to 12, but the processing costs are increased somewhat.

The slurry is agitated in a tank to keep the suspension uniform and is treated by bubbling a gas containing carbon dioxide through the suspension. Carbon dioxide may be in any concentration desired. It may be obtained from flue gas. Usually concentrations of about 30 per cent are satisfactory. Flue gas from the burning of oil or gas is desirable, as avoiding contamination of the products with ash. The gas desirably should be substantially free from sulphur compounds. Carbon dioxide generated in the calcining step may be applied, and more may be obtained from conversion of magnesium carbonate to the oxide in a subsequent step of the process, or such supplemental carbon dioxide as necessary may be provided from any suitable source.

For the formation of the carbonate crystals, the technique of carbonation may be varied somewhat. Usually it is desirable to carbonate fairly rapidly until the hydrogen ion concentration drops from a pH of about 12.3 to 10.0; then to seed the suspension with magnesium carbonate in a suitable form and amount and stop carbonation for a short time, as for instance two hours. Then the carbonation may slowly proceed until the pH drops to about 7.2. At this point, the carbonating step is complete. The reaction may be carried out at room temperature, or about 70° F. The presence of some metals may contaminate the product.

With the object of forming crystals of hydrous magnesium carbonate, the slurry is provided with carbon dioxide, and for example the hydrous magnesium carbonate normally is nesquehonite, $MgCO_3.3H_2O$, in prismatic crystals, while the calcium carbonate is crypto-crystalline. With suitable carbonation, these two substances are discrete and separable in the manner referred to more in detail below. With improper carbonation, the nesquehonite may contain occluded calcium carbonate and the calcium carbonate may contain nesquehonite. Also, the nesquehonite crystals may be too fine or too variable in size for proper separation. The best separation may be obtained when the nesquehonite forms fairly large and uniform prisms.

The size and form of the magnesium carbonate crystals are largely determined by the number of crystalline nuclei which are formed and the speed at which carbonation is effected. Too rapid a carbonation through the critical period in which nesquehonite starts forming, that is, when the pH drops from 12 to about 10.0, will form so many nesquehonite nuclei that in subsequent carbonation no large, easily separable crystals will be formed. The speed and technique of carbonation may be adjusted to give a desirable number of crystals. However, best results seem to be obtained by seeding with large nesquehonite crystals in the critical period and thereafter carbonating slowly enough that the crystals grow without forming small new crystals.

I have found that calcium hydroxide will react with nesquehonite to form calcium carbonate and magnesium hydroxide. This reaction may be used, if desired, to eliminate an excess of small nesquehonite crystals. I normally carbonate so rapidly that calcium hydroxide within the grains is not completely reacted when nesquehonite begins forming in the suspension. If the suspension is seeded at this critical point and the carbonation stopped for a short time, the small crystals of nesquehonite undesirably formed will be eliminated, leaving the seed crystals to fulfill their desired function. Alternatively, burned dolomite or lime may be used to eliminate excess nesquehonite nuclei.

While complete carbonation may be accomplished in a very few hours or less, it is usually desirable to employ a period of 12 hours to several days, the exact time being a matter of compromise between purity of product and economics.

While I find that nesquehonite is particularly susceptible to separation, I do not wish to limit myself to this substance only. Nesquehonite forms from suspensions at temperatures of about 62° F. to about 130° F., but above the latter point a finely crystallized phase forms which is difficult to separate. Below about 62° F. lansfordite, $MgCO_3.5H_2O$, forms in tabular crystals. Therefore, I intend the method to include any hydrated magnesium carbonate which may be synthetically formed in the presence of calcium carbonate and is separable by flotation, and all such are included in the term "magnesium carbonate" in the claims hereinafter.

With proper calcination, grain size and carbonation prior to the separation by flotation, flotation may be accomplished with both excellent recovery and selectivity. As mentioned, the calcined dolomite should not be too finely ground. Also, during the time in which it is in an easily disintegrated hydroxide or carbonate form, it should not be agitated, pumped or otherwise treated in such a manner as further to comminute the particles. The hydroxides and nesquehonite in particular are adversely affected by violent agitation. The fine undesirable particles might be eliminated by a desliming process prior to flotation, but the best procedure seems to be to prevent their formation. Usually, flotation is difficult if much matter finer than 5 microns in dimension is present.

With normal processing, nesquehonite when treated with suitable collectors has an unusual hydrophobic character. The apparatus in which flotation is effected may be of any convenient construction or design. Also, the technique of flotation may be conventional.

There are several collectors which are effective. In general, these substances are organic acids or salts of organic acids which, in water solution, are anionic in character. Some of these are sodium palmitate, naphthenic acid, sodium naphthenate, distillate from pine tar, and sodium oleate. I prefer to employ sodium naphthenate and this I use in amounts of about 1.2 lbs. per ton of solids. With these collectors, the magnesium carbonate is collected in the froth and the calcium carbonate in the tailings.

The froths formed by the collectors themselves are adequate for ordinary flotation. However, they lack stability and in some cases a more permanent froth may be desired. Such a froth can be obtained by using 1.2 pounds of sodium naphthenate and about 0.02 pound of sodium sulphonated lauryl alcohol per ton of solids. Or, alternatively, the froth may be modified by about 0.2 pound of terpineol per ton of solids. Special conditions also might require the use of other modifying agents, but we have not encountered them.

I have found a pH of from 8 to 9.5, such as we ordinarily obtain, to be satisfactory. A higher pH gives a reduction in selectivity, but such a condition is abnormal. The slurry density in the flotation cells may be varied over wide limits without adversely affecting flotation. A concentration of from 5 to 15 per cent solids and a temperature of about 70° F. are satisfactory.

The magnesium carbonate froth coming from the flotation cells is then de-watered. If hydrous magnesium carbonate is desired, it is merely dried at a temperature lower than 150° F. If anhydrous magnesium carbonate is desired, it is heated to about 250° F. If a product is desired in the form of magnesium oxide, it may be heated to 1200–1600° F. in a suitable furnace, and the carbon dioxide may be recovered for use in the process. By suitable control of furnace temperature, either light or heavy oxide may be produced. Such oxides may in turn be hydrated to magnesium hydroxide, if the product be desired in such form.

The quality of magnesia recoverable is dependent upon the carbonation control and also upon the refinement in the flotation circuit. With normal carbonation along lines afore-described, about 86 per cent of the magnesia may be recovered by a single flotation step without de-sliming, and a product be obtained having a magnesia content of about 84 per cent and about 15 per cent CaO. This, with suitable purification such as centrifuging in a liquid with a specific gravity of about 2.3 can be changed to a product of 95 per cent magnesia or better, on the basis of complete calcination. A cleaner flotation treatment also may be employed to reduce the CaO. The silica and other impurities of the original rock are concentrated in the residual carbonate sludge. Where desired, the small amount of calcium carbonate present in this refined product may be removed by further treatment to obtain a product of chemical quality. The calcium carbonate residue may be used in the manufacture of Portland cement, agricultural dust, filler, etc.

As an example of my process: I calcined a dolomite from the Niagaran formation, Northern Ohio, having the follow composition: Ignition loss 47.3 per cent. $SiO_2$ 0.23 per cent, $Fe_2O_3$ 0.057 per cent, $Al_2O_3$ 0.065 per cent, CaO 30.3 per cent, MgO. 21.2 per cent, at a temperature of about 2400° F. in a rotary kiln. The calcined product was then ground to 90 per cent minus 200 mesh, and hydrated in a suspension of 1 part of calcined dolomite to 10 parts of water. In glass-lined equipment this suspension was agitated and a gas containing about 30 per cent $CO_2$ bubbled through the suspension until the hydrogen ion concentration changed from a pH of about 12.3 to about 10.0, and the suspension was then seeded with a slurry containing nesquehonite crystals. The seed were grown by carbonating a small amount of magnesium hydroxide in a water suspension. I then stopped carbonation for a period of about 2 hours and allowed any excess nesquehonite nuclei to be absorbed by the action of residual calcium hydroxide. I then carbonated at a rate which was so adjusted that the seed grew to a large size without forming new and small crystals. The process was complete when the pH dropped below 8. The temperature was about 75° F. during this process and the nesquehonite in the final slurry was in large uniform crystals, with an average breadth of about 12 microns. I then thinned the suspension, in this case without de-sliming, to about 5 per cent of solids, and conditioned it with about 1.2 pounds of sodium napthenate per ton of solids. This was then separated into two fractions by froth flotation. The products so formed were characterized by crystalline hydrous magnesium carbonate of uniform size and aggregates of smaller crystals of calcium carbonate, and in the concentrate product the magnesium carbonate very greatly predominated and provided the particular utilities for the product, while the tailings had a predominance of calcium carbonate determining its utilities. The distribution of the products of the calcined dolomite was as follows:

Analysis of dried products:

|  | Tailings | Concentrates |
| --- | --- | --- |
|  | Per cent | Per cent |
| Ignition loss | 45.72 | 62.15 |
| $SiO_2$ | 0.86 | 0.01 |
| $R_2O_3$ | 0.34 | 0.09 |
| CaO | 46.70 | 5.85 |
| MgO | 6.31 | 30.90 |

Analysis expressed on a calcined basis:

|  | Per cent | Per cent |
| --- | --- | --- |
| $SiO_2$ | 1.6 | 0.02 |
| $R_2O_3$ | 0.6 | 0.2 |
| CaO | 85.9 | 14.8 |
| MgO | 11.6 | 84.0 |
| Amount of calcined product obtained from 100 parts of calcined dolomite | 59 | 41 |

This application is a continuation, in part, and as to common subject matter, of my application Serial No. 476,496, filed February 19, 1943.

Other modes of applying the principle of the invention may be employed, change being made as regards the details described, provided, the features stated in any of the following claims, or the equivalent of such, be employed.

I therefore particularly point out and distinctly claim as my invention:

1. A process of separating carbonates of magnesium and calcium, which comprises calcining dolomite, making a slurry of the calcined material, supplying carbon dioxide and forming calcium carbonate and growing crystals of magnesium carbonate in the slurry to a mechanically separable size, separating the mass consisting of synthetic crystals of magnesium carbonate and calcium carbonate into a magnesium carbonate concentrate and calcium carbonate tailings by diluting the slurry, and in the presence of a flotation-collector subjecting to flotation.

2. A process of separating carbonates of magnesium and calcium, which comprises calcining dolomite, making a slurry of the calcined material, supplying carbon dioxide and forming calcium carbonate and growing crystals of magnesium carbonate in the slurry to a mechanically separable size, and in the presence of a flotation-collector, separating the mass consisting of synthetic crystals of magnesium carbonate and calcium carbonate into a magnesium carbonate concentrate and calcium carbonate tailings by subjecting to flotation.

3. A process of separating carbonates of magnesium and calcium which comprises making a slurry of calcined dolomite, forming calcium carbonate and growing crystals of magnesium carbonate in the slurry to a mechanically separable size, diluting the slurry, and in the presence of a flotation-collector separating the mass consisting of synthetic crystals of magnesium carbonate and calcium carbonate into a magnesium carbonate concentrate and calcium carbonate tailings by subjecting to flotation.

4. A process of separating carbonates of magnesium and calcium, which comprises making a slurry of calcined dolomite, forming calcium carbonate and growing crystals of magnesium carbonate in the slurry to a mechanically separable size, and in the presence of a flotation-collector separating the mass consisting of synthetic crystals of magnesium carbonate and calcium carbonate into a magnesium carbonate concentrate and calcium carbonate tailings by subjecting to flotation.

5. A process of separating carbonates of magnesium and calcium, which comprises growing crystals of magnesium carbonate to a mechanically separable size in an aqueous suspension, and separating the mass consisting of synthetic crystals of magnesium carbonate and calcium carbonate into a magnesium carbonate concentrate and calcium carbonate tailings by flotation.

6. A process of separating carbonates of magnesium and calcium, which comprises synthetically providing crystals of magnesium carbonate of mechanically separable size in an aqueous suspension in the presence of calcium carbonate, and separating the magnesium carbonate from the calcium carbonate by flotation in the presence of sodium naphthenate.

7. A process of separating carbonates of magnesium and calcium, which comprises synthetically providing crystals of magnesium carbonate of mechanically separable size in an aqueous suspension in the presence of calcium carbonate, and separating the magnesium carbonate from the calcium carbonate by flotation in the presence of a collector providing a soap fatty acid radical.

8. A process of separating carbonates of magnesium and calcium, which comprises synthetically providing crystals of magnesium carbonate of mechanically separable size in an aqueous suspension in the presence of calcium carbonate, and separating the magnesium carbonate from the calcium carbonate by flotation in the presence of a collector which in water solution is anionic in character.

9. A process of separating carbonates of magnesium and calcium which comprises synthetically providing crystals of magnesium carbonate of mechanically separable size in an aqueous suspension and separating the mass consisting of synthetic crystals of magnesium carbonate and calcium carbonate into a magnesium carbonate concentrate and calcium carbonate tailings by flotation.

ROBERT A. SCHOENLAUB.

REFERENCES CITED

The following references are of record in the file of this patent:

UNITED STATES PATENTS

| Number | Name | Date |
|---|---|---|
| 2,205,923 | Doerner et al. | June 25, 1940 |
| 2,280,905 | Fahrenwald | Apr. 28, 1942 |
| 1,101,772 | Young | June 30, 1914 |
| 1,329,434 | Sheard et al. | Feb. 3, 1920 |
| 2,358,818 | Miller | Sept. 26, 1944 |
| 2,222,332 | Weinig | Nov. 19, 1940 |

OTHER REFERENCES

American Institute of Mining and Metallurgical Engineers, Technical Publication #733, "Flotation of California Magnesites," pamphlet by Sinkinson et al., September 1936.